US009661603B2

(12) United States Patent
Aldana

(10) Patent No.: US 9,661,603 B2
(45) Date of Patent: May 23, 2017

(54) PASSIVE POSITIONING UTILIZING BEACON NEIGHBOR REPORTS

(71) Applicant: QUALCOMM Incorporated, San Diego, CA (US)

(72) Inventor: Carlos Horacio Aldana, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 14/268,931

(22) Filed: May 2, 2014

(65) Prior Publication Data
US 2015/0063228 A1 Mar. 5, 2015

Related U.S. Application Data

(60) Provisional application No. 61/985,247, filed on Apr. 28, 2014, provisional application No. 61/973,034, (Continued)

(51) Int. Cl.
*H04W 24/10* (2009.01)
*H04W 64/00* (2009.01)
(Continued)

(52) U.S. Cl.
CPC ......... *H04W 64/00* (2013.01); *G01S 5/0081* (2013.01); *G01S 5/021* (2013.01); *G01S 5/10* (2013.01);
(Continued)

(58) Field of Classification Search
CPC ......... G01S 5/0081; G01S 5/021; G01S 5/10; H04W 24/02; H04W 24/10; H04W 48/12; H04W 64/00; H04W 64/003
(Continued)

(56) References Cited

U.S. PATENT DOCUMENTS 6,061,337 A * 5/2000 Light ............... H04W 36/32
370/331
8,010,133 B2 8/2011 Cheok et al.
(Continued)

FOREIGN PATENT DOCUMENTS

CN 102647263 A 8/2012
CN 102884440 A 1/2013
(Continued)

OTHER PUBLICATIONS

Second Written Opinion from International Application No. PCT/US2014/050309, dated Jul. 16, 2015, 8 pp.
(Continued)

*Primary Examiner* — Andrew Lai
*Assistant Examiner* — Mahmudul Hasan
(74) *Attorney, Agent, or Firm* — Hunter Clark PLLC

(57) ABSTRACT

Techniques for providing neighbor reports for use in passive positioning of a client station are disclosed. An example method for broadcasting network neighbor reports according to the disclosure includes generating a beacon transmission, determining a neighbor report count value, if the neighbor report count value is greater than zero, then broadcasting the beacon transmission including at least a beacon frame and the neighbor report count value, and decrementing the neighbor report count value; if the neighbor report count value is equal to zero, then broadcasting the beacon transmission including at least a beacon frame and a neighbor report, and resetting the neighbor count value.

15 Claims, 12 Drawing Sheets

Related U.S. Application Data filed on Mar. 31, 2014, provisional application No. 61/873,253, filed on Sep. 3, 2013, provisional application No. 61/872,087, filed on Aug. 30, 2013.

(51) Int. Cl.
| | |
|---|---|
| G01S 5/00 | (2006.01) |
| G01S 5/02 | (2010.01) |
| G01S 5/10 | (2006.01) |
| H04W 24/02 | (2009.01) |
| H04W 48/12 | (2009.01) |

(52) U.S. Cl.
CPC ............ *H04W 24/02* (2013.01); *H04W 24/10* (2013.01); *H04W 48/12* (2013.01)

(58) Field of Classification Search
USPC .................................................. 370/328, 329
See application file for complete search history.

(56) References Cited

U.S. PATENT DOCUMENTS

| | | | |
|---|---|---|---|
| 8,547,870 | B2 | 10/2013 | Curticapean |
| 8,781,492 | B2 | 7/2014 | Das et al. |
| 8,929,918 | B2* | 1/2015 | Siomina ..................... 370/338 |
| 8,948,063 | B2 | 2/2015 | Aryan et al. |
| 9,392,621 | B2 | 7/2016 | Bachu et al. |
| 2004/0008138 | A1* | 1/2004 | Hockley, Jr. .......... G01S 5/0072 342/357.48 |
| 2004/0081127 | A1* | 4/2004 | Gardner ............. H04N 1/00204 370/338 |
| 2004/0230373 | A1* | 11/2004 | Tzamaloukas ......... G01C 21/28 701/468 |
| 2006/0089138 | A1* | 4/2006 | Smith ............... H04W 52/0229 455/426.1 |
| 2006/0133281 | A1* | 6/2006 | Witherell .............. H04L 1/1854 370/238 |
| 2006/0285507 | A1* | 12/2006 | Kinder .................. H04W 48/12 370/310 |
| 2007/0014269 | A1* | 1/2007 | Sherman ............... H04W 48/12 370/338 |
| 2007/0268856 | A1* | 11/2007 | Wijting ............... H04W 40/248 370/328 |
| 2008/0188236 | A1* | 8/2008 | Alles ....................... G01S 5/021 455/456.1 |
| 2009/0005052 | A1* | 1/2009 | Abusch-Magder ... H04W 24/02 455/446 |
| 2009/0016247 | A1* | 1/2009 | Sood .................... H04W 12/06 370/310 |
| 2009/0088182 | A1* | 4/2009 | Piersol .................. H04W 48/12 455/456.1 |
| 2009/0280825 | A1* | 11/2009 | Malik ...................... G01S 5/04 455/456.1 |
| 2010/0128617 | A1* | 5/2010 | Aggarwal ........... H04W 56/009 370/252 |
| 2010/0135178 | A1 | 6/2010 | Aggarwal et al. |
| 2010/0296495 | A1* | 11/2010 | Iino ........................ H04L 12/46 370/338 |
| 2011/0117924 | A1 | 5/2011 | Brunner et al. |
| 2011/0130149 | A1* | 6/2011 | Yao ....................... H04W 48/12 455/453 |
| 2011/0286469 | A1* | 11/2011 | Yasuda .................... H04L 1/188 370/412 |
| 2011/0306358 | A1* | 12/2011 | Alizadeh-Shabdiz G01S 5/0278 455/456.1 |
| 2012/0021692 | A1* | 1/2012 | Lee ...................... H04B 7/0617 455/67.11 |
| 2012/0057481 | A1 | 3/2012 | Kim |
| 2012/0106370 | A1* | 5/2012 | Radulescu ........ H04W 36/0083 370/252 |
| 2012/0314587 | A1* | 12/2012 | Curticapean .......... G01S 5/0257 370/252 |
| 2012/0315919 | A1* | 12/2012 | Hirsch .................. G01S 13/767 455/456.1 |
| 2013/0005347 | A1 | 1/2013 | Curticapean |
| 2013/0121173 | A1 | 5/2013 | Chen et al. |
| 2013/0170374 | A1 | 7/2013 | Aljadeff |
| 2014/0160959 | A1* | 6/2014 | Aldana ............... H04L 43/0864 370/252 |
| 2014/0187259 | A1* | 7/2014 | Kakani ................. H04W 64/00 455/456.1 |
| 2014/0192713 | A1* | 7/2014 | Park ..................... H04B 7/2656 370/328 |
| 2014/0213193 | A1 | 7/2014 | Zhang et al. |
| 2015/0049716 | A1 | 2/2015 | Gutierrez et al. |
| 2015/0063138 | A1 | 3/2015 | Aldana |

FOREIGN PATENT DOCUMENTS

| | | |
|---|---|---|
| CN | 102947723 A | 2/2013 |
| EP | 2046084 A1 | 4/2009 |
| WO | 2008124316 A1 | 10/2008 |
| WO | 2010059934 A2 | 5/2010 |
| WO | 2010151830 A2 | 12/2010 |
| WO | 2011063153 A2 | 5/2011 |
| WO | 2011088410 A1 | 7/2011 |
| WO | 2011137396 A1 | 11/2011 |
| WO | 2013026407 A1 | 2/2013 |
| WO | 2013028629 A2 | 2/2013 |
| WO | 2013052077 A1 | 4/2013 |

OTHER PUBLICATIONS

Second Written Opinion from International Application No. PCT/US2014/050314, dated Jul. 16, 2015, 10 pp.
International Preliminary Report on Patentability—PCT/US2014/050309—European Patent Office—Berlin, Germany, Nov. 11, 2015, 10 pgs.
International Preliminary Report on Patentability—PCT/US2014/050314—European Patent Office—Berlin, Germany, Nov. 11, 2015, 11 pgs.
International Search Report and Written Opinion—PCT/US2014/050309—ISA/EPO—Feb. 3, 2015, 14 pgs.
International Search Report and Written Opinion—PCT/US2014/050314—ISA/EPO—Feb. 5, 2015, 14 pgs.
Lindskog E (CSR Technology): "Client Positioning using Timing Measurements between Access Points; 11-13-0072-00-000m-client-positioning-using-timing-measurements-between-access-points", IEEE SA Mentor; 11-13-0072-00-000M-Client-Positioning-Using-Timing-Measurements-Between-Access-Points, IEEE-SA Mentor, Piscataway, NJ USA, vol. 802.11m, Jan. 12, 2013 (Jan. 12, 2013), pp. 1-13, XP068040470, [retrieved on Jan. 12, 2013] p. 4-p. 6 p. 11.
Gallo P., et al., "WIDAR: Bistatic WI-fi Detection and Ranging for off-the-shelf devices," IEEE 14th International Symposium and Workshops on a World of Wireless, Mobile and Multimedia Networks (WoWMoM), 2013, 6 pages.
Wang, B., Liu, Z.-J., Bin W., Li, H.-B., & Zhang, B. (Feb. 2000). Round Trip Time Estimation Scheme in Active Reliable Multicast Transport. Journal of Xidian University, National Key Lab. of Integrated Services Network, Xidian University, Xi' an 710071, China, 29(1), 62-66.

* cited by examiner

400

| B0 - B7 | B8 - B15 | B16 - B19 | B20 - B23 | B24 - B31 | B32 - B47 |
|---|---|---|---|---|---|
| Element ID | Length | N_AP Passive | AP-to-AP Burst Time Out | Min. Delta FTM | AP-to-AP Partial TSF Timer |
| 8 | 8 | 4 | 4 | 8 | 16 |

Bits

| B48 | B49 | B50 - B55 | B56 - B57 | B58 - B63 |
|---|---|---|---|---|
| Reserved | Reserved | AP-to-AP FTM Channel Spacing/Format | Reserved | AP-to-AP Switch Period |
| 1 | 1 | 6 | 2 | 8 |

Bits

FIG. 4

PASSIVE POSITIONING UTILIZING BEACON NEIGHBOR REPORTS

CROSS-REFERENCE TO RELATED APPLICATIONS

This application claims the benefit of U.S. Provisional Application No. 61/872,087, entitled, "Passive Positioning Schemes," filed on Aug. 30, 2013, U.S. Provisional Application No. 61/873,253, entitled, "Passive Positioning Schemes," filed on Sep. 3, 2013, U.S. Provisional Application No. 61/973,034, entitled, "Passive Positioning Utilizing Beacon Neighbor Reports," filed Mar. 31, 2014, and U.S. Provisional Application No. 61/985,247, entitled, "Passive Positioning Utilizing Beacon Neighbor Reports," filed Apr. 28, 2014, each of which is assigned to the assignee hereof and the contents of which are incorporated herein by reference in their entirety.

BACKGROUND

Embodiments of the inventive subject matter generally relate to the field of wireless communication and, more particularly, to providing neighbor reports in a passive positioning scheme for wireless communication devices.

Various positioning techniques can be employed for determining the position of a wireless communication device (e.g., a wireless local area network (WLAN) device) based on receiving wireless communication signals. For example, positioning techniques can be implemented that utilize time of arrival (TOA), the round trip time (RTT) of wireless communication signals, received signal strength indicator (RSSI), or the time difference of arrival (TDOA) of the wireless communication signals to determine the position of a wireless communication device in a wireless communication network. These factors may be used in conjunction with the known positions of one or more stations in the wireless network to derive the location of the wireless communication device.

SUMMARY

An example of a wireless transceiver for providing network information to a broadcast area according to the disclosure includes a memory and at least one processor configured to periodically broadcast a beacon transmission with a neighbor report count value at a first interval, and periodically broadcast a beacon transmission with a neighbor report element at a second interval.

Implementations of such a wireless transceiver may include one or more of the following features. The neighbor report count value may be an integer value, or may be another symbol to be used in a logical comparison operation (e.g., greater than, less than, equal to, etc. . . . ). An Access Point to Access Point (AP-to-AP) signaling parameter format information element may be broadcast. The beacon transmission with the neighbor report count value and the beacon transmission with the neighbor report element may be in a Media Access Control (MAC) control frame format. The beacon transmission with the neighbor report element may include a latitude value and a longitude value. The beacon transmission with the neighbor report element may include a civic location. The beacon transmission with the neighbor report element may include a visitation index to indicate an order in which one or more access points are to be visited.

An example of a method for broadcasting network neighbor reports with an access point according to the disclosure includes generating a beacon transmission, determining a neighbor report count value, if the neighbor report count value is greater than zero, then broadcasting the beacon transmission including at least a beacon frame and the neighbor report count value, and decrementing the neighbor report count value; if the neighbor report count value is equal to zero, then broadcasting the beacon transmission including at least a beacon frame and a neighbor report, and resetting the neighbor count value.

Implementations of such a method may include one or more of the following features. The neighbor report may include one or more neighbor record elements. The neighbor record elements may include latitude and longitude values. The beacon transmission may include at least a beacon frame, an AP-to-AP signaling parameter element, and a neighbor report count value. The AP-to-AP signaling parameter element may include a AP-to-AP Fine Timing Measurement (FTM) burst timeout value, and/or Minimum Delta Fine Timing Measurement (FTM) value. The neighbor count value may be a value between 200 and 1000. A beacon transmission may be generated and broadcast at least every 100 milliseconds. The order that the neighbor report is transmitted is an indication of the order of the APs that are going to be visited by the AP transmitting the neighbor report.

An example of a method for determining a current position with a client station according to the disclosure includes receiving a network beacon transmission with the client station, determining a neighbor report count value based on the beacon transmission, receiving a neighbor report if the neighbor report count value equals zero, determining a location of one or more access points in the neighbor report, and calculating a current position of the client station based at least in part on the location of the one or more access points.

Implementations of such a method may include one or more of the following features. FTM messages transmitted between two or more access points in the wireless network may be received. An AP-to-AP signaling parameter element may be received by the client station if the neighbor report count equals zero.

Items and/or techniques described herein may provide one or more of the following capabilities, as well as other capabilities not mentioned. Passive positioning of mobile network devices may be realized. Client station position request message traffic may be reduced. Access point location information may be systematically delivered to multiple client stations in a broadcast area. Network message traffic may be reduced. Further, it may be possible for an effect noted above to be achieved by means other than that noted, and a noted item/technique may not necessarily yield the noted effect.

BRIEF DESCRIPTION OF THE DRAWINGS

FIG. 4 is an exemplary AP-to-AP signaling parameter format information element.

DETAILED DESCRIPTION

Figure 1A:
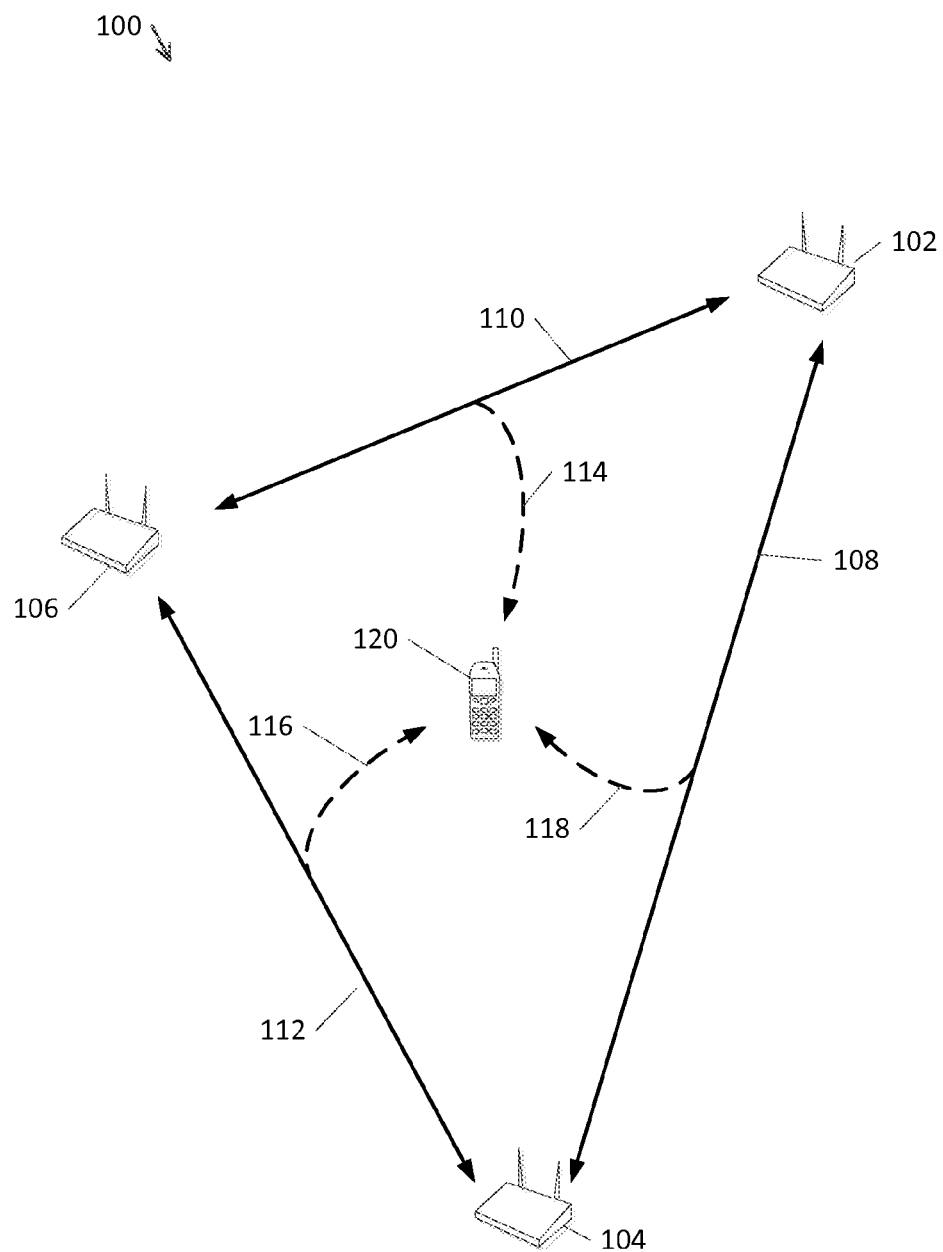
FIG. 1A is an example block diagram of a passive positioning scheme for determining the position of a client station.

The description that follows includes exemplary systems, methods, techniques, instruction sequences, and computer program products that embody techniques of the present inventive subject matter. However, it is understood that the described embodiments may be practiced without these specific details. For instance, although examples refer to a passive positioning scheme for wireless local area network (WLAN) devices, embodiments are not so limited. In other embodiments, the passive positioning scheme can be implemented by other wireless standards and devices (e.g., WiMAX devices). In other instances, well-known instruction instances, protocols, structures, and techniques have not been shown in detail in order not to obfuscate the description.

In wireless communication networks, determining the position of an electronic device with wireless communication capabilities (e.g., within an indoor or outdoor environment) can be a desired feature for users of the communication device (e.g., mobile phone users) and operators of the wireless communication network. In some systems, round-trip time (RTT) techniques can be implemented for determining the position of the communication device. For example, the communication device can transmit a request message to multiple access points and can receive a response message from each of the access points. The range between the communication device and each of the access points can be determined by measuring the round trip time between the request messages and the corresponding response messages. The position of the communication device can be determined by comparing the RTT information to the known locations of the access points. In some systems, time difference of arrival (TDOA) techniques can be implemented for determining the position of the communication device. For example, the communication device can determine its position based on the difference between the ranges from each of the access points to the communication device. However, the onus for initiating the RTT positioning operations (or the TDOA positioning operations) (e.g., transmitting the request message to the access points) typically lies on the communication device. Because the communication device plays an active role in transmitting the request messages to each access point, the communication device may consume a substantial amount of bandwidth and power. Moreover, if the wireless communication network comprises multiple such communication devices, such as in a crowded sports stadium or other popular venue, each communication device may be required to execute the RTT positioning operations (or the TDOA positioning operations), increasing the traffic load in the wireless communication network.

A position calculation unit of the communication device can be configured to determine the position of the communication device based on a passive positioning scheme to reduce the traffic load in the wireless communication network. The access points in the wireless communication network can be configured to broadcast beacon transmissions and exchange fine timing messages periodically with one or more neighboring access points (i.e., a target access point) in the wireless communication network. The access point can include a neighbor report in the beacon transmission. The neighbor report may include a list of access points, and the corresponding position information (e.g., Latitude value, Longitude value, Altitude, Z axis information, Civic location information) for each access point. In an embodiment, the access point may determine RTT timing information associated with the one or more neighboring access points based on the time difference between a Fine Timing Measurement (FTM) message transmitted, and a corresponding acknowledgment (ACK) response message transmitted by the target access point. The position calculation unit can intercept the FTM message and the corresponding ACK message, and can determine TDOA timing information based on the time difference of arrival between the FTM message and the corresponding ACK message. The neighbor report may include RTT measurement information comprising the RTT timing information associated with each access point in the neighbor report. The position calculation unit can then determine the position of the communication device based, at least in part, on the TDOA timing information, the RTT timing information, and position information associated with a predetermined number of network access points.

A passive positioning scheme utilizing beacon neighbor reports can eliminate transmissions initiated by the communication device to request access point position information. This can minimize the impact of the communication device transmissions on the traffic load of the wireless communication network. Furthermore, because the beacon neighbor reports can be provided across the network (e.g., each access point can broadcast a period neighbor report), the passive positioning scheme may enable larger numbers of communication devices within the range of the access point network to compute their position without consuming the network bandwidth associated with receiving and processing location requests from each of the communication devices.

Referring to FIG. 1A, an example block diagram of a passive positioning scheme utilizing beacon neighbor reports is shown. The passive positioning scheme includes a wireless communication network 100 comprising three access points 102, 104, 106, and a client station 120. The access points 102, 104, 106 may be an advanced WLAN access points capable of determining their own positions (e.g., a self-locating access point). Each of the access points can select one or more other access points in the wireless communication network 100 (e.g., within the communication range of one another). In some implementations, access points can be arranged that one access point can be designated as a master access point, and the other access points can be designated as target access points. The client station 120 can be any suitable electronic device (e.g., a notebook computer, a tablet computer, a netbook, a mobile phone, a gaming console, a personal digital assistant (PDA), inventory tag, etc.) with WLAN communication capabilities. Furthermore, in FIG. 1A, the client station 120 is within the communication range of one or more access points 102, 104, 106.

In an embodiment, the access point 102 transmits a periodic FTM messages to one or more of the other access points 104, 106. The communication between the access points 102, 104, 106 may follow a programmed schedule. For example, a first access point 102 may communicate with a second access point 104 for a set amount of time (e.g., AP1-to-AP2 period), and then the first access point 102 will switch to communicate with a third access point 106 for a set amount of time (e.g., AP1-to-AP3 period). During the communication period, the access point may send a series of FTM messages and receive a corresponding number of Acknowledgement messages (ACK). The FTM messages can comprise an identifier associated with the first access point (e.g., a network address of the access point 102), an identifier associated with a second access point (e.g., a network address of the access point 104), a sequence number that identifies each of the FTM messages, and a timestamp indicating the time instant at which each of the FTM messages was transmitted and a timestamp indicating the time instant at which each Ack messages was received. Other information elements may be included in a FTM messages based on the network standards (e.g., IEEE 802.11). In response to receiving the FTM message, the second access point (e.g., the access point 104 in this example) can generate and transmit a corresponding acknowledgment ACK response message. In one implementation, the ACK message indicates receipt of a FTM message. Other information elements may be included in an ACK message based on network standards (e.g., IEEE 802.11).

In the example of FIG. 1A, the first access point 102 can exchange FTM/ACK messages 108 with the second access point 104, and also can exchange FTM/ACK messages 110 with another access point 106. The second access point 104 also can exchange FTM/ACK messages 112 with another access point 106. Each of the access points 102, 104, 106 may also broadcast beacon transmissions including a neighbor report.

The client station 120 can intercept the FTM messages and the ACK response messages to determine TDOA timing information associated with the access points 102, 104, 106. The dashed lines 114, 116, 118 represent the client station 120 intercepting the FTM/ACK messages 108, 110, 112 exchanged between the access points 102, 104, 106 (e.g, the AP cluster). The client station 120 can also receive beacon transmissions from each of the access points 102, 104, 106.

In an embodiment, the access points 102, 104, 106 can broadcast periodic beacon transmissions to the client station 120. The beacon transmission may include beacon frame information, such as defined in network standards document (e.g., 802.11, table 8-24). The beacon transmission may also include a neighbor report count value. The beacon transmission may periodically also include AP-to-AP signaling parameters and a neighbor report. The neighbor report may include position information associated with each neighboring access point, and may also include RTT and/or TDOA timing information for the neighboring access points. The client station 120 can receive the beacon transmission and can store the access point position information, the TDOA timing information, and the RTT timing information associated with the neighboring access points, in a predetermined memory location, a data structure, or another suitable storage device.

The client station 120 is configured to determine a position based, at least in part, on the AP position information included in the beacon transmissions. In some implementations, the client station 120 can use the AP position information, in combination with the TDOA timing information, and/or the RTT timing information to construct a "positioning equation" in terms of the range between the client station 120 and each of the predetermined number of access points. For example, on determining that AP position information, the TDOA timing information, and the RTT timing information associated with three target access points are available, the client station 120 can solve three positioning equations to determine a three-dimensional position of the client station 120. It is noted that in other implementations, the client station 120 can determine a position based on the AP position information, the TDOA timing information, and the RTT timing information associated with any suitable number of access points. For example, a position can be based on two independent positioning equations from the AP position information, the TDOA timing information, and the RTT timing information associated with two target access points to determine a two-dimensional position of the client station 120.

Figure 1B:
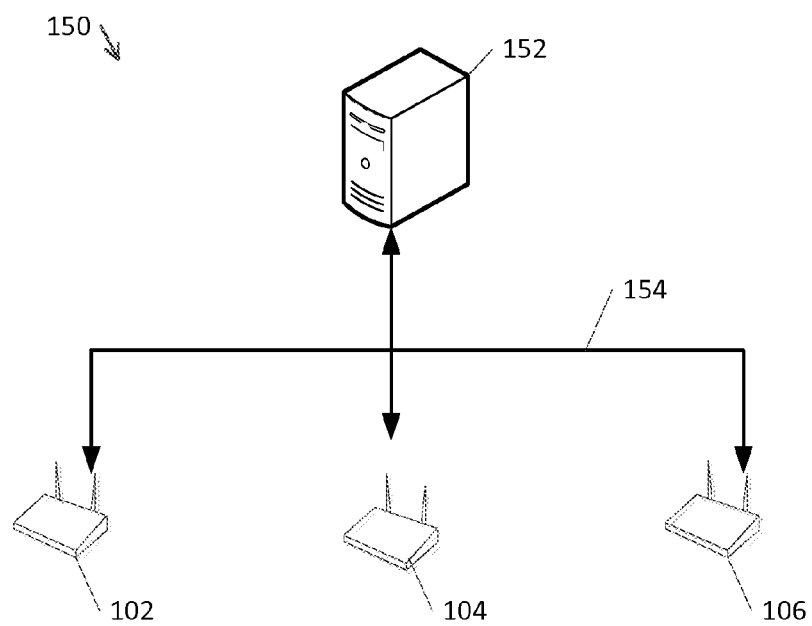
FIG. 1B is an example network diagram of a wireless local area network including a position server.

Referring to FIG. 1B, an example network diagram of a wireless local area network including a position server is shown. The network 150 includes access points 102, 104, 106, a position server 152, and a communication path 154. The position server 152 is a computing device including at least one processor and a memory and is configured to execute computer executable instructions. For example, a position server 152 comprises a computer system including a processor, non-transitory memory, disk drives, a display, a keyboard, a mouse. The processor is preferably an intelligent device, e.g., a personal computer central processing unit (CPU) such as those made by Intel® Corporation or AMD®, a microcontroller, an application specific integrated circuit (ASIC), etc. The memory includes random access memory (RAM) and read-only memory (ROM). The disk drives include a hard-disk drive, a CD-ROM drive, and/or a zip drive, and may include other forms of drives. The display is a liquid-crystal display (LCD) (e.g., a thin-film transistor (TFT) display), although other forms of displays are acceptable, e.g., a cathode-ray tube (CRT). The keyboard and mouse provide data input mechanisms for a user. The position server 152 stores (e.g., in the memory) processor-readable, processor-executable software code containing instructions for controlling the processor to perform functions described herein. The functions assist in the implementation of a passive positioning scheme utilizing beacon neighbor reports. The software can be loaded onto the memory by being downloaded via a network connection, uploaded from a disk, etc. Further, the software may not be directly executable, e.g., requiring compiling before execution. The access points 102, 104, 106 are configured to communicate with the position server 152 to exchange position information via the communication path 154. The communication path 154 can be a wide area network (WAN) and can include the internet. The position server 152 can include a data structure (e.g., relational database, flat files) to store AP neighbor information. For example, the position server 152 can include AP position information (e.g., lat./long., x/y), RTT information, SIFS information, and other information associated with an access point (e.g., SSID, MAC address, uncertainty value, coverage area, etc.). An access point 102, 104, 106 can communicate with the position server 152 and can retrieve, for example, AP neighbor information, SIFS information and RTT information for use in client station positioning solutions. The configuration of the position server 152 is exemplary only, and not a limitation. In an embodiment, the position server 152 may be connected directly to an access point, or the functionality may be included in an access point. More than one position servers may be used. The position server 152 can include one or more databases containing position information associated with other access points on additional networks. In an example, the position server 152 is comprised of multiple server units.

Figure 2:
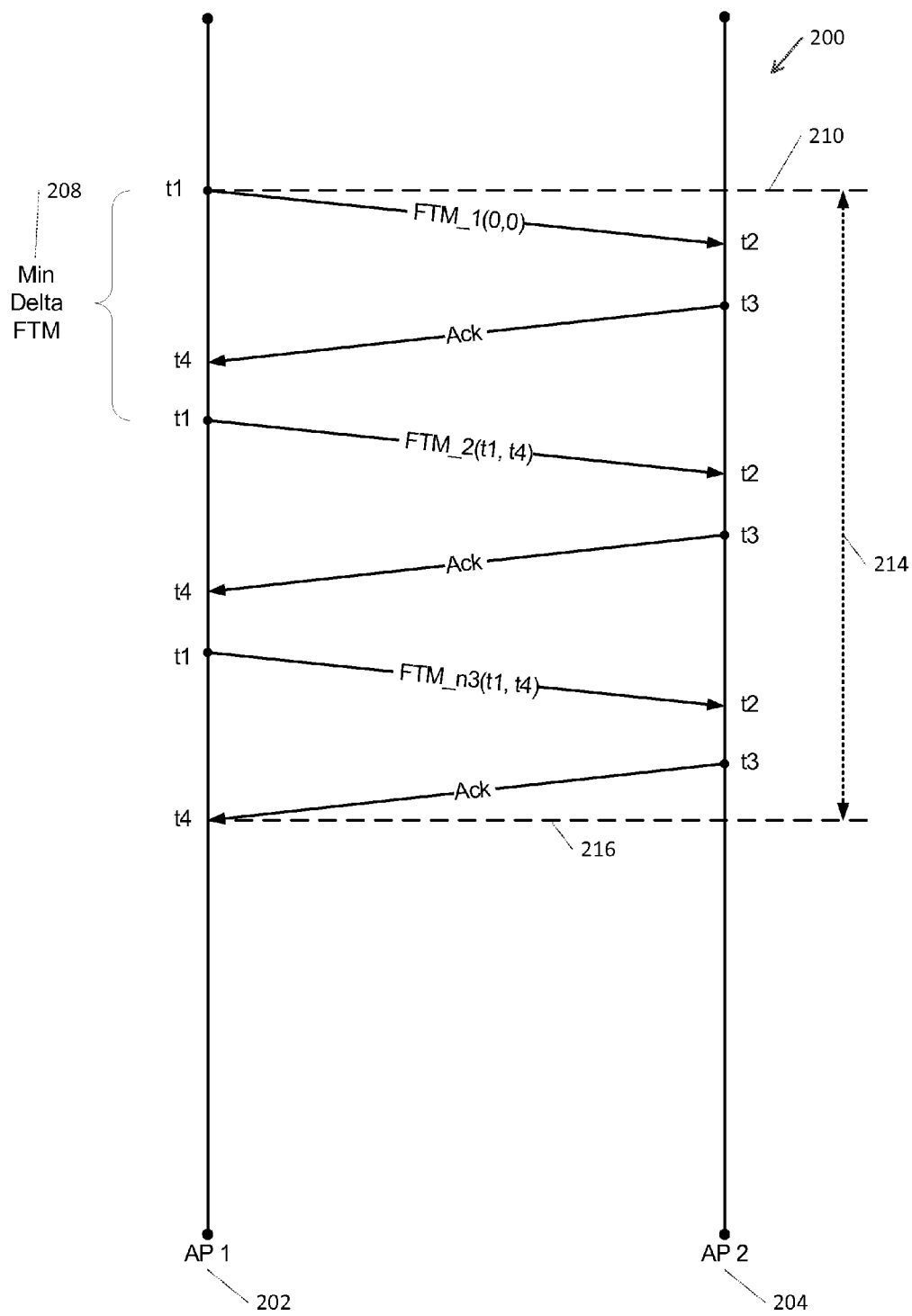
FIG. 2 is an example of a conceptual diagram of a fine timing measurement procedure.

Referring to FIG. 2, with further reference FIG. 1A, an example of a conceptual diagram of a fine timing measurement procedure 200 is shown. The general approach includes a first access point 202 (e.g., AP 1) and a second access point 204 (e.g., AP 2). The first and second access points may be any of access points 102, 104, 106. As a general distinction, an access point may serve multiple stations but the terms as used herein are not so limited. The relevant operations described herein may be performed on both stations and access points, thus the terms are used interchangeably. The fine timing measurement procedure 200 may allow the first access point 202 to obtain its range with second access point 204. An access point may perform this procedure with multiple other access points in order to obtain its location. An FTM session is an instance of a fine timing measurement procedure 200 between the first access point 202 and the second access point 204, and may include the associated scheduling and operational parameters of that instance. An FTM session is generally composed of a negotiation, a measurement exchange and a termination. An access point may participate in multiple concurrent FTM sessions. Concurrent FTM sessions may occur with responding stations that are members of different Basic Service Sets (BSS) and possibly different Extended Service Sets (ESS), or possibly outside of a BSS, each session using its own scheduling, channel and operational parameters. A responding access point may be required to establish overlapping FTM sessions with a large number of initiating access points (e.g. a first access point 102 providing measurements to multiple other access points 104, 106 at stadium, a mall or a store). An access point may have multiple ongoing FTM sessions on the same or different channels with different responding access points, while being associated to a particular access point for the exchange of data or signaling. To support the constraints of both the access points, during the negotiation the first access point 202 initially requests a preferred periodic time window allocation. The second access point 204 subsequently responds by accepting or overriding the allocation request based on its resource availability and capability. Since some of the first access point's 202 activities may be non-deterministic and may have higher precedence than the FTM session (e.g. data transfer interaction with an associated AP), a conflict may prevent the first access point 202 from being available at the beginning of a burst instance determined by the second access point 204. In such an example, the first access point 202 may establish sessions with the second access point 204, and a third access point (e.g., access point 106) on different channels. Each of the sessions' burst periodicity may be different and each of the stations' clock offsets may differ. Thus, over time, some temporal conflicts may occur. To overcome this, during each burst instance the initiating station may indicate its availability by transmitting a trigger frame in the form of a Fine Timing Measurement Request frame. During each burst instance, the responding station transmits one or more fine timing measurement frames as negotiated.

In an example, the first access point may send a Fine Timing Measurement frame which may include a set of scheduling parameters to describe the initiating station's availability for measurement exchange. The Fine Timing Measurement frame may include a Fine Timing Measurement Parameter element to define the parameters to be used during the fine timing measurement exchanges. For example, the stations can establish a Minimum Delta FTM time 208 to indicate the minimum time between consecutive FTM messages. The timing of the burst instances are defined by a AP-to-AP Partial Timer Synchronization Function (TSF) Timer value 210. The AP-to-AP Partial TSF Timer value is a partial TSF timer at the beginning of the first burst instance and is the boundary of the burst period. The AP-to-AP Burst Timeout value 216 is the time duration of each burst instance starting at the boundary of a burst period. The AP-to-AP Switch Period 214 is the interval from the beginning of one AP-to-AP burst instance (e.g., 210) to the beginning of the following AP-to-AP burst instance (e.g., 216). Exemplary values of the AP-to-AP switch period generally range from 1 microsecond to a few seconds based on network hardware and operational considerations. Within each burst instance, consecutive Fine Timing Measurement frames are generally spaced at least the Minimum Delta FTM time 208 apart. Within each burst instance the initiating station may perform fine timing measurement on each Fine Timing Measurement frame addressed to it.

Figure 3A:
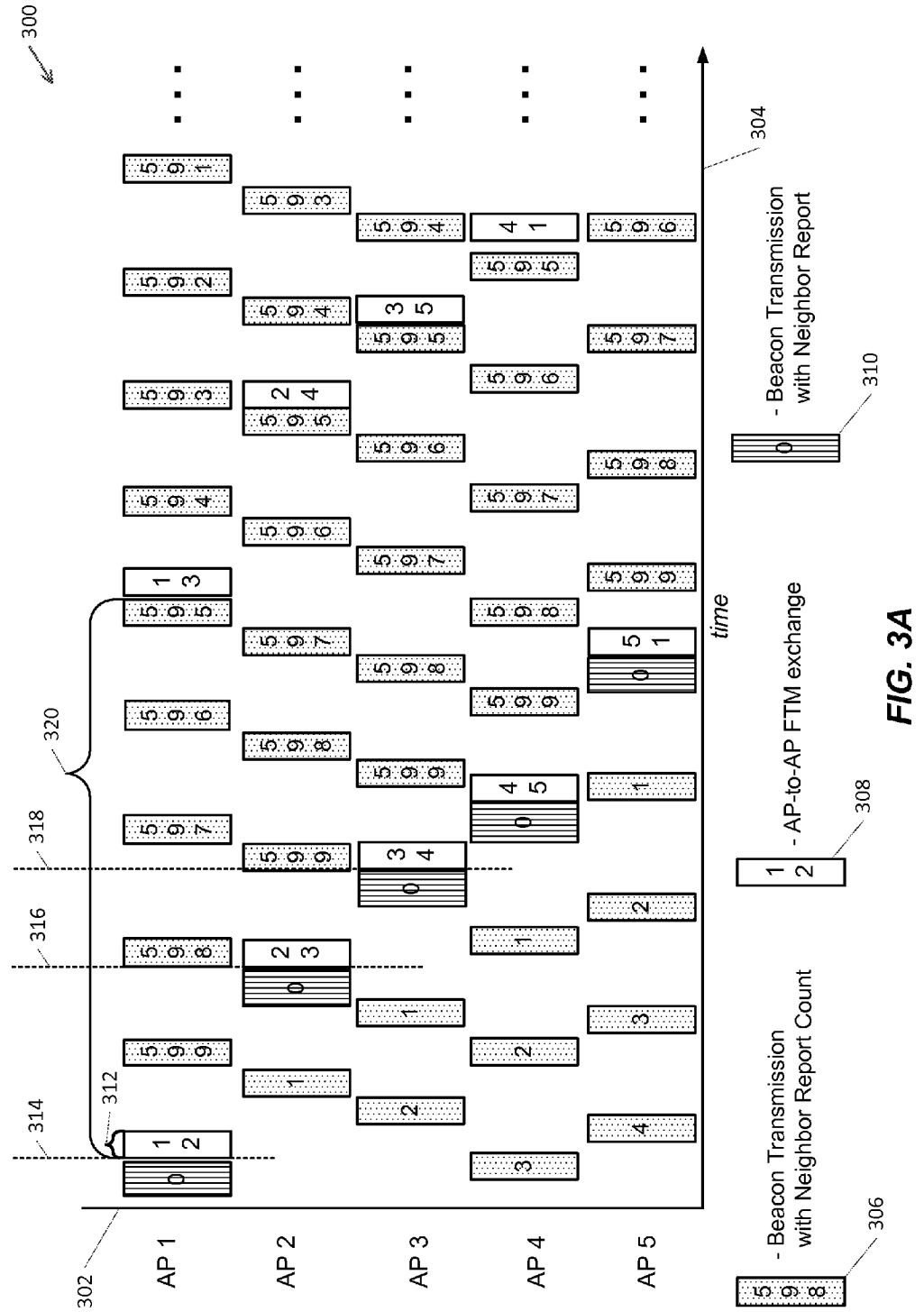
FIGS. 3A and 3B are examples of AP-to-AP signaling schemes including beacon transmissions.

Referring to FIG. 3A, with further reference to FIGS. 1A and 2, an example of a first AP-to-AP signaling scheme 300, including Beacon Transmissions, is shown. The first AP-to-AP signaling scheme 300 includes a y-axis 302 with a list of the access points (e.g., AP1, AP2, AP3, AP4, AP5) in a cluster, an x-axis 304 to indicate the progression of time, indications of time slots for beacon transmissions 306 for each of the access points, indications of time slots for AP-to-AP FTM exchanges 308 for each of the access points, and time slots for Beacon Transmission with Neighbor Report 310. The first AP-to-AP signaling scheme 300 also includes indications of an AP-to-AP burst time out 312, an AP1 AP-to-AP Partial TSF Timer value 314, an AP2 AP-to-AP Partial TSF Timer value 316, an AP3 AP-to-AP Partial TSF Timer value 318, and an indication of an AP-to-AP Switch period 320. The AP-to-AP burst time out 312 represents the time period of the FTM message exchanges represented in FIG. 2. Each of the AP-to-AP FTM exchange 308 elements represent the FTM message exchanges between the indicated access points (e.g., AP1-to-AP2, AP1-to-A3, AP2-to-AP3, etc. . . . ). Each of the partial TSF values 314, 316, 318 indicates the partial value of the respective responding station's TSF timer at the time of the first burst instance. The AP-to-AP switch period 320 during which normal traffic exchanges occur between the indicated stations (e.g., AP1-to-AP2, AP1-to-A3, AP2-to-AP3, etc. . . . ). Each of the beacon transmissions 306 includes a neighbor report count value (e.g., 599, 598, 597 . . . 0). In operation, each access point (e.g., AP1, AP2, AP3, AP4, AP5) broadcasts a periodic beacon transmission. The beacon transmissions 306 may conform to established Media Access Control (MAC) control frame formats, but will also include a neighbor report count value. As depicted in FIG. 3A, the beacon transmissions are provided at intervals of 100 ms, with the neighbor report count value decreasing in each subsequent transmission. Thus, in this example, 10 beacon transmissions are sent by each access point every second and the neighbor report count value will cycle between 600 and zero every minute for each beacon transmission. The beacon intervals and neighbor report count values are exemplary only as other values may be used based on network requirements. When the network report count value reaches zero (e.g., on the $600^{th}$ beacon transmission), a beacon transmission with a neighbor report 310 is broadcast. The neighbor report is described in more detail below, but in general, a neighbor report provides client stations in the broadcast area with information required to perform passive positioning calculations. For example, a beacon transmission with a neighbor report 310 may be used in the passive positioning methods described in co-pending Provisional U.S. Patent Application No. 61/873,253, filed on Sep. 3, 2013, 2014, and titled "Passive Positioning Schemes."

Figure 3B:
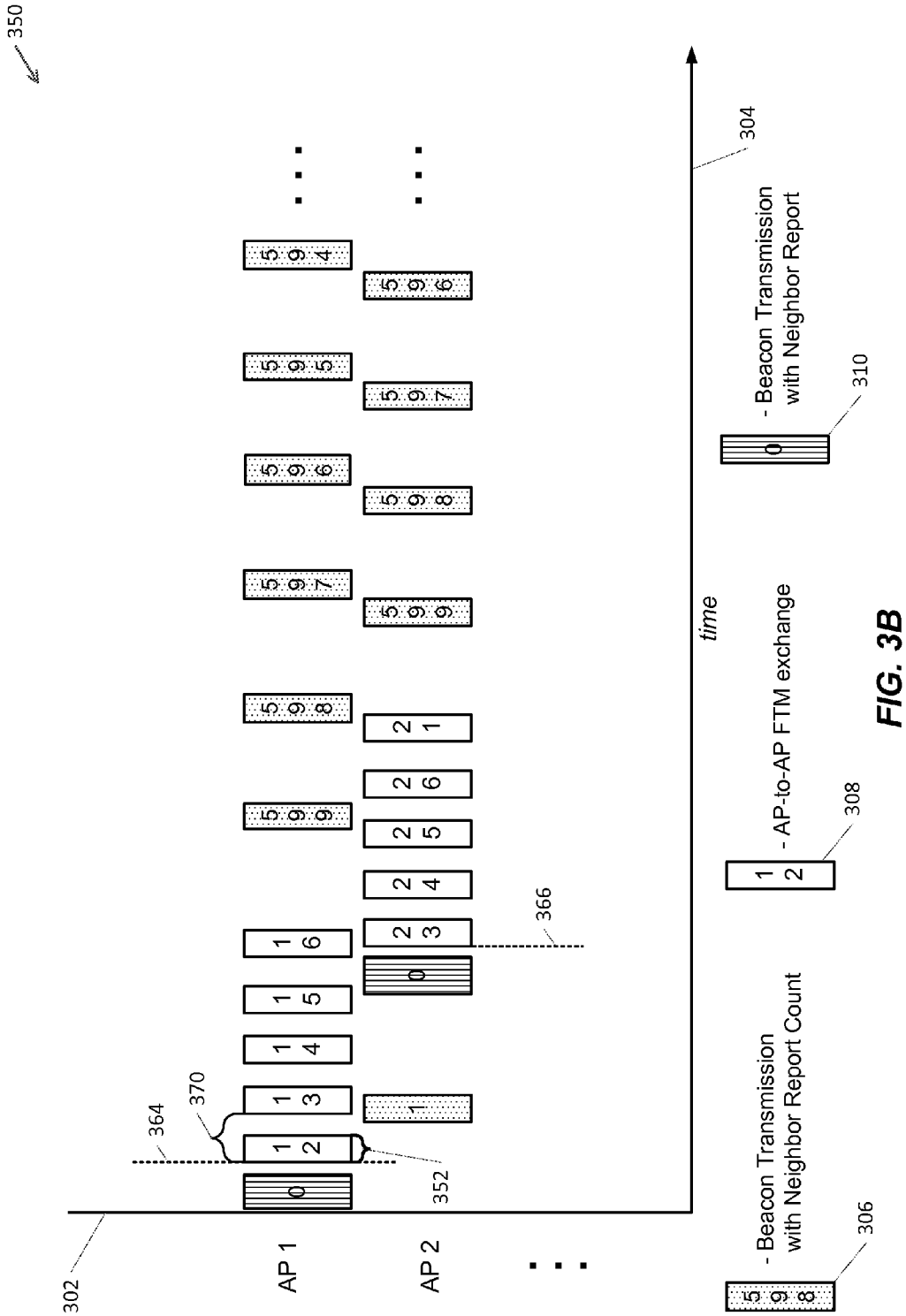

Referring to FIG. 3B, with further reference to FIGS. 1A, 2 and 3A, an example of a second AP-to-AP signaling scheme 350, including Beacon Transmissions, is shown. The second AP-to-AP signaling scheme 350 includes a y-axis 302 with a list of the access points (e.g., AP1, AP2) in an exemplary cluster, an x-axis 304 to indicate the progression of time, indications of time slots for beacon transmissions 306 for each of the access points, indications of time slots for AP-to-AP FTM exchanges 308 for each of the access points, and time slots for Beacon Transmission with Neighbor Report 310. The list of two access points (e.g., AP1, AP2) is an example only, and not a limitation, as the cluster includes additional access points (e.g., AP3, AP4, AP5, and AP6) which are not shown. The second AP-to-AP signaling scheme 350 varies the order and the timing of the AP-to-AP FTM exchanges as compared to the first AP-to-AP signaling scheme 300. The second AP-to-AP signaling scheme 350 also includes indications of an AP-to-AP burst time out 352, an AP1 AP-to-AP Partial TSF Timer value 364, and an AP2 AP-to-AP Partial TSF Timer value 366, and an indication of an AP-to-AP switch period 370. The duration of the AP-to-AP switch period 370 may be around 250 microseconds. The sequence and/or the relative time of the AP-to-AP FTM exchanges 308 as compared to the beacon transmissions 306 and the beacon transmissions with neighbor report 310 may vary based on network constraints.

Referring to FIG. 4, an AP-to-AP signaling parameter format information element 400 is shown. The AP-to-AP signaling parameter format information element 400 may be part of a beacon transmission and broadcast on a periodic basis. In an example, the AP-to-AP signaling parameter format information element 400 is included in the beacon transmission with a neighbor report 310. The AP-to-AP signaling parameter format information element 400 may be broadcast at an interval that is independent of the beacon transmissions. The AP-to-AP signaling parameter format information element 400 consists of a MAC frame format message of 64 bits including an Element ID field (8 bits), a Length field (8 bits), an N_AP Passive field (4 bits), an AP-to-AP Burst Time Out field (8 bits), a Min. Delta FTM field, an AP-to-AP Partial TSF Timer field (16 bits), an AP-to-AP FTM Channel Spacing/Format field (6 bits), and an AP-to-AP switch period field (8 bits). The ElementID and length fields provide for message administration as known in the art. The N_AP Passive field contains an indication of the number of access points to be visited during passive FTM exchanges. The AP-to-AP Burst Time Out indicates the duration of a burst instance. Typical values for the burst instance are between 128 milliseconds and 250 microseconds. An example of the Min. Delta FTM field is depicted in FIG. 2 and represents the minimum time between consecutive FTM messages. The AP-to-AP Partial TSF timer field indicates the partial value of a responding station TSF timer at the time of the first AP-to-AP burst instance. The units may be the same as the Partial TSF timer, which is 1 TU, 1024 microseconds. The AP-to-AP FTM Channel Spacing/Format field indicates the desired packet bandwidth/format used by all the Fine Timing Measurement frames in a FTM session. The AP-to-AP switch period field indicates the duration between switch from one AP to the next (e.g., as depicted in FIGS. 3A and 3B). Other examples of the AP-to-AP signaling Parameter Format Information Element 400 may include an FTM per Burst field (5 bits) to indicate the interval between two consecutive burst instances.

Figure 5:
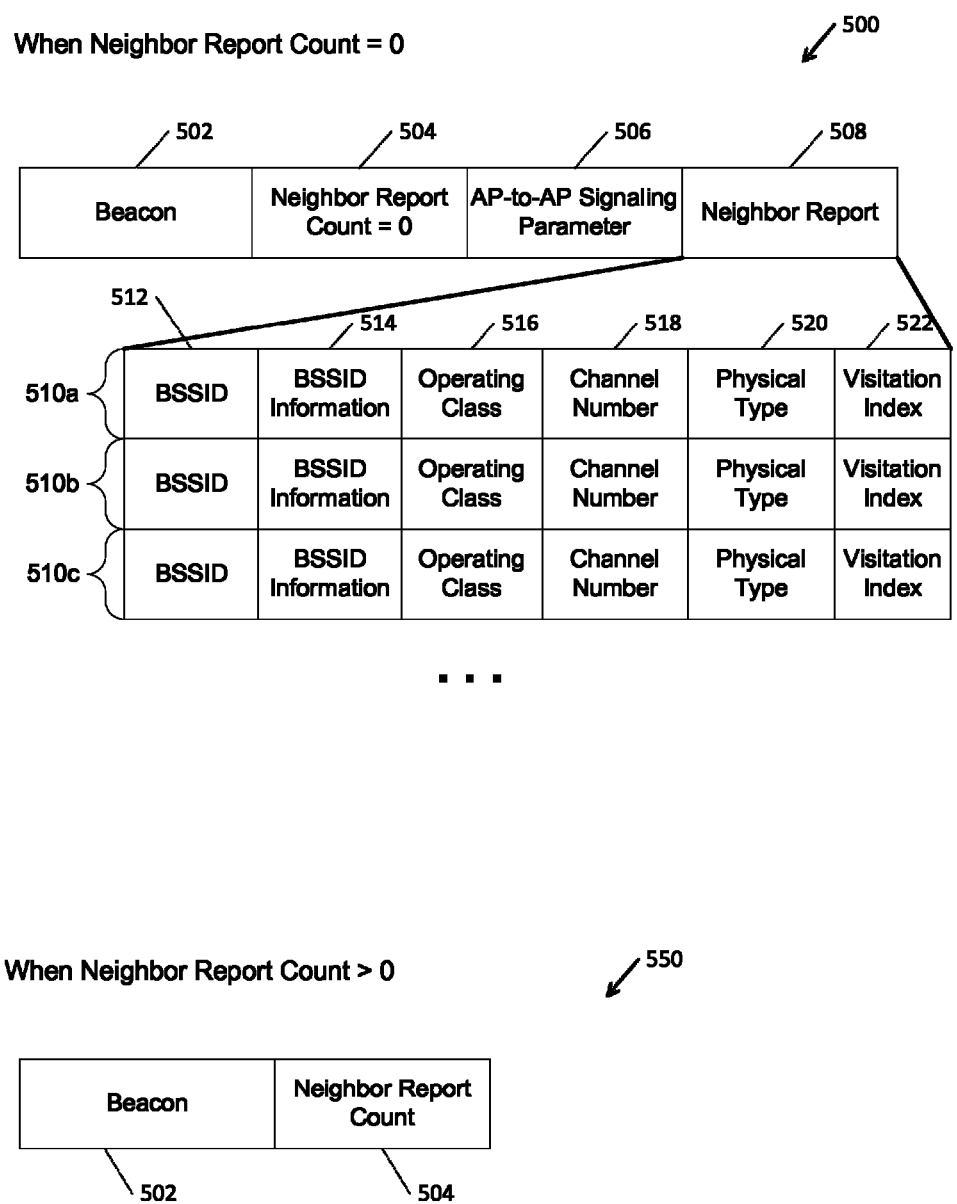
FIG. 5 includes examples of beacon transmission frames.

Referring to FIG. 5, with further reference to FIGS. 3A, 3B and 4, examples of Beacon Transmissions frames are shown. A beacon transmission with a neighbor report frame 500 may include a beacon element 502, a neighbor report count element 504, and AP-to-AP Signaling Parameter element 506, and a neighbor report element 508. The beacon element 502 may include a beacon frame body such as described in the IEEE P802.11 standard, table 8-24. The beacon frame body may be expanded to include the neighbor report count element 504. The neighbor report count element 504 provides information relating to the broadcast of the next neighbor report. As described in FIGS. 3A and 3B, in an example, the neighbor report count element can be a countdown value which decreases with each subsequent beacon transmission. The AP-to-AP Signaling Parameter element 506 includes the fields described in FIG. 4 (i.e., the AP-to-AP Signaling Parameter Format Information Element 400).

The neighbor report element 508 can be a MAC frame format such as described in the IEEE P802.11 standard, FIG. 8-255. The neighbor report element 508 is included in the beacon transmission with a neighbor report frame 500 and thus is provided to the client stations on a periodic basis. The neighbor report element 508 may include multiple neighbor record elements 510 (e.g., 510a, 510b, 510c), with each of the multiple neighbor record elements containing information associated with a neighboring station. The neighbor report element may contain position information (e.g., latitude, longitude, altitude) for each of the neighbors. The neighbor report element may be constrained to only include a sufficient list of neighboring stations to perform passive positioning and/or passive ranging. An exemplary neighbor record element 510 may also include a Basic Service Set Identification (BSSID) field 512, a BSSID Information field 514, an operating class field 516, a channel number field 518, a physical type field 520, and a visitation index 522. Other sub-element fields may also be included. The BSSID field 512 represents the BSSID of the BSS being reported. The BSSID Information field 514 may be used to determine neighbor service set transition candidates. The operating class field 516 may be used to indicate operational frequency ranges (e.g., 2.4 GHz, 5 GHz), as well as channel spacing. The channel number field 518 may be used to provide channel center frequency information. The physical type field 520 indicates the PHY type of the AP indicted by the BSSID (e.g., ODFM, HT, DMG). The visitation index 522 indicates the priority (e.g., order) and how each of the corresponding access points are visited. This index may prevent additional signaling once the neighbor report element 508 is received. For example, AP1 may visit (e.g., send FTM packets) to AP2 at the partial TSF timer time period. AP1 may then visit AP3 for a fixed amount of time, and then visit AP4. In general, if the visited AP is on the same channel, the visiting AP will just send FTM packets. If the visited AP is on a different channel, the visiting AP will go to the new channel, send FTM packets to that AP, and then return to the original channel to serve the client stations. The order of the visits may be based on the order of the visitation index in the network record elements.

A beacon transmission with a neighbor count value 550 includes a beacon element 502, and a neighbor report count element 504. The beacon transmission with a neighbor count value 550 is provided on a periodic basis as described in FIGS. 3A and 3B, such that the value of the neighbor report count element 504 is reduced with each transmission. The effect is to provide the receiving station with a timer for anticipating the broadcast of the neighbor report. The decrementing counter is an example only, and not a limitation, as other timer and/or counting processes may be used.

Figure 6A:
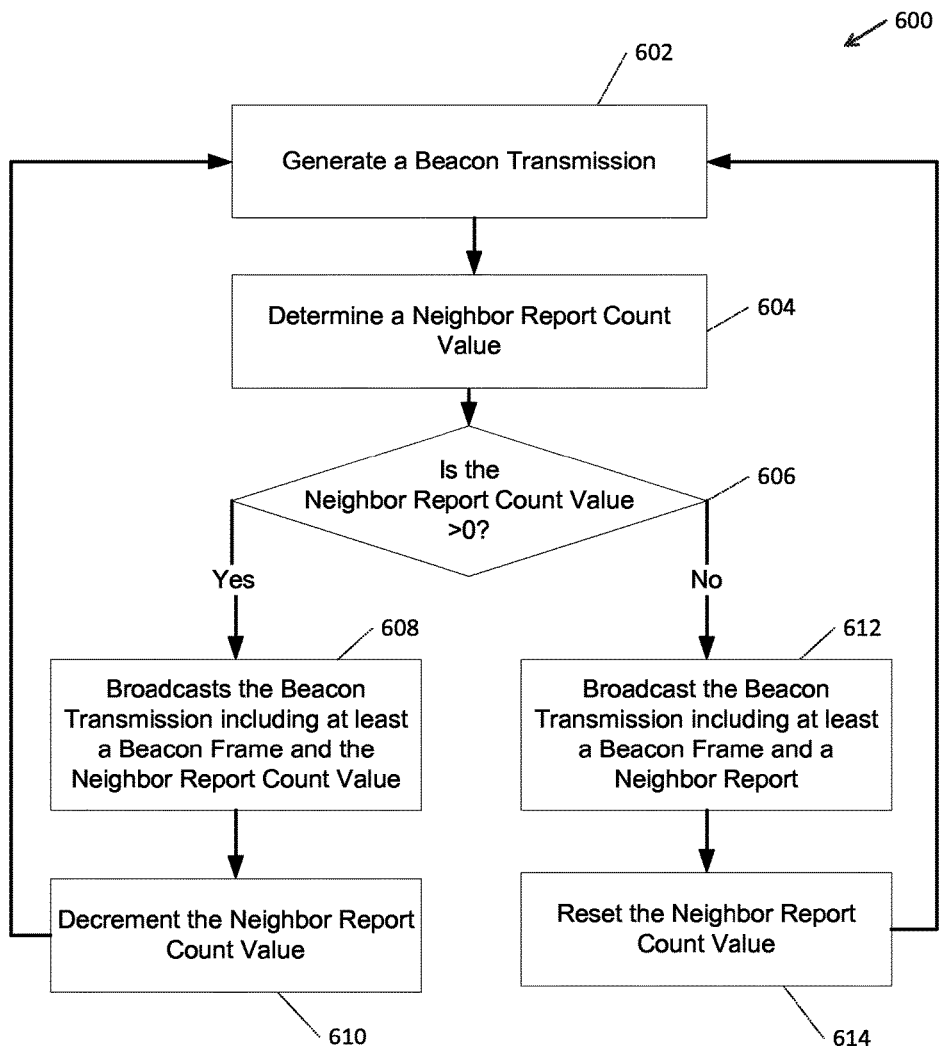
FIG. 6A is flow diagram of a process for generating a beacon transmission including a neighbor report.

In operation, referring to FIG. 6A, with further reference to FIGS. 1A-5, a process 600 for generating a beacon transmission including a neighbor report includes the stages shown. The process 600, however, is exemplary only and not limiting. The process 600 may be altered, e.g., by having stages added, removed, or rearranged. For example, determining and decrementing the neighbor report count value may occur at different points in the process 600.

At stage 602, an access point is configured to generate a beacon transmission. The beacon transmission can be a MAC frame format with an additional field to record a neighbor report count value. The beacon report may include a beacon element 502 which is previously stored in memory and a neighbor report count field can be updated when the beacon transmission is generated. In an example, a beacon transmission is generated every 100 milliseconds. The time may be modified based on network parameters, such as the number access points in a network, the number of client stations, and the hardware capabilities of the access points and client stations (e.g., 10, 50 100, 500, 1000 milliseconds). At stage 604, the access point is configured to determine a neighbor report count value. The neighbor report count value may be an integer value and may represent the number of subsequent beacon transmissions to be broadcast before neighbor information is provided to the client stations in the broadcast area. The maximum neighbor report count value can be established based on the frequency of the beacon transmission, as well as other network parameters. For example, when a beacon transmission is broadcast every 100 milliseconds, the maximum neighbor report count value can be 600 in order to provide neighbor report information to the client stations once every minute.

At stage 606 the access point is configured to perform logic operation to determine whether the neighbor report count value is greater than zero. If the neighbor report count value is greater than zero, then the process continues to stage 608 and the access point broadcasts the beacon transmission including at least a beacon frame and the neighbor report count value. For example, the beacon transmission can be a beacon transmission with a neighbor count value 550 which is broadcast every 100 ms. After the beacon transmission is broadcast, at stage 610, the access point is configured to decrement the neighbor report count value by 1 such that when the process iterates back to stage 602, the subsequent beacon transmission will have a neighbor report count value that is one less than the previously transmitted beacon transmission.

At stage 612, if the access point determines that the neighbor report count value is equal to zero, the access point is configured to broadcast the beacon transmission including at least a beacon frame and a neighbor report. For example, the beacon transmission will be a beacon transmission with a neighbor report frame 500 as described in FIG. 5. The access point is then configured to reset the neighbor report count value to a predetermined value at stage 614. The neighbor report count value may be reset to any value (e.g., 1, 2, 20, 200, 400, 1000, 10,000). A value of 600 was used for the example above. The neighbor report count value may be set to other values, and each access point in a network may have a different value. For example, a position server 152 may evaluate the load on network resource and determine that a first access point 102 should broadcast neighbor report information at a rate that is twice that of a second access point 104. The timing of beacon transmissions, and the corresponding neighbor report information, may be modified based on the operational requirements and capabilities of the network 150.

Figure 6B:
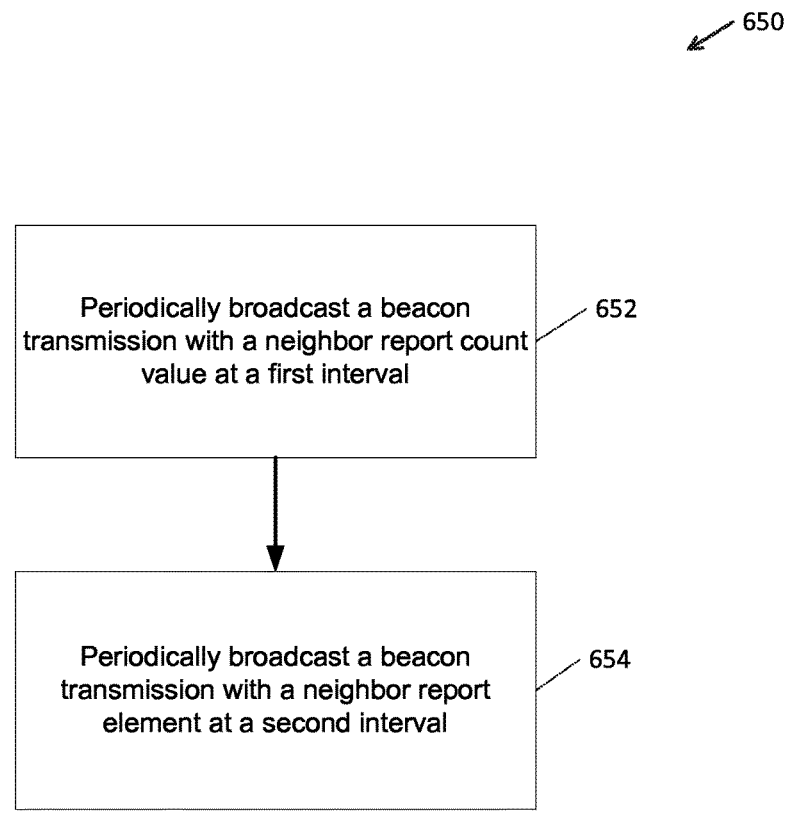
FIG. 6B is flow diagram of a process for periodically broadcasting beacon transmissions.

In operation, referring to FIG. 6B, with further reference to FIGS. 1A-5, a process 650 for periodically broadcasting beacon transmissions includes the stages shown. The process 650, however, is exemplary only and not limiting. The process 650 may be altered, e.g., by having stages added, removed, or rearranged.

At stage 652, a wireless transceiver (e.g., access point) is configured to periodically broadcast a beacon transmission with a neighbor report count value at a first interval. The beacon transmission may be MAC frame format with a data field indicating a neighbor report count value. The neighbor report count value may be an integer value, and the access point may be configured to decrease the neighbor report count based on the first interval. In an embodiment, the neighbor report count value may be any data to indicate approximately when a neighbor report element will be available to a client station. The duration of the first interval may be established based on network capabilities and performance requirements. As previously discussed, an exemplary value for the first interval is approximately 100 milliseconds. Other values ranging from microseconds to minutes may be used. In an example, the beacon transmission with a neighbor report count value also includes an AP-to-AP signaling parameter format information element 400.

At stage 654, the wireless transceiver is configured to periodically broadcast a beacon transmission with a neighbor report element at a second interval. The duration of the second interval is larger than the duration of the first interval. In an example, the beacon transmission with a neighbor report element is broadcast in place of the beacon transmission with a neighbor report count value. The beacon transmission with a neighbor report element may include an AP-to-AP signaling parameter format information element 400. The beacon transmission may be a MAC frame format. The neighbor report element may include a plurality of neighbor record elements. A visitation index in each of the neighbor record elements may indicate the priority and how each of the corresponding access points are visited. In the examples above, the duration of the second interval has been on the order of a minute. That is, every $600^{th}$ beacon transmission, when the beacon transmissions are sent every 100 ms. The first and second intervals, however, are not so limited as other durations may be used based on network capabilities and performance expectations. For example, the neighbor report element in a small network may be broadcast more often because a neighbor report consisting of a few neighbor record elements may place little demand on the available bandwidth. Other performance issues such as latency and expected mobility of the client stations may also be used to determine the duration of the first and second intervals.

Figure 7:
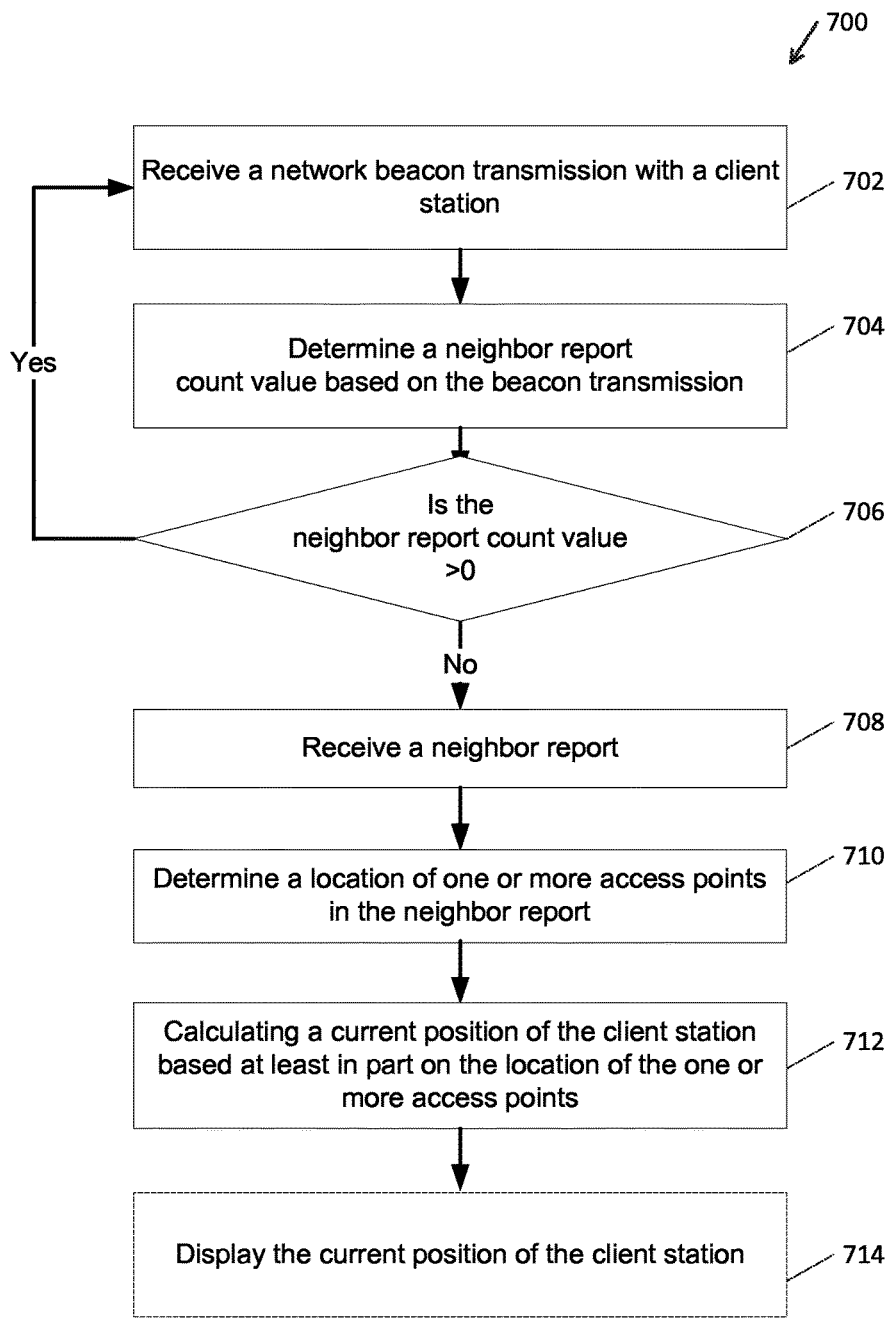
FIG. 7 is flow diagram of a process for determining the position of client station.

In operation, referring to FIG. 7, with further reference to FIGS. 1A-5, a process 700 for determining the position of a client station includes the stages shown. The process 700, however, is exemplary only and not limiting. The process 700 may be altered, e.g., by having stages added, removed, or rearranged. For example, a position calculation can be made by the processors on the client station 120 (i.e., local), or by the processors in the position server 152 (i.e., remote). Displaying the current position of a client station at stage 714 is optional.

At stage 702, a client station 120 is configured to receive a beacon transmission from an access point. The beacon transmission may include a beacon frame element and a neighbor report count element. The beacon frame element may include fields related to general network information. At stage 704, the client station 120 is configured to evaluate the received beacon transmission and determine a value of the neighbor report count element. The neighbor report count value may be an integer, or other value that may be used in a logical comparison operation. For example, as stage 706, a logical comparison is performed by the client station 120 to determine if the neighbor report count value is greater than zero. If the neighbor report count value is greater than zero, then the client station 120 continues to monitor the network and may receive another beacon transmission at stage 702 when the process iterates.

At stage 708, if the result of the logical operation at stage 706 fails, the client station is configured to receive a neighbor report. The neighbor report may be included in the beacon transmission. For example, the beacon transmission received at stage 702 may be a beacon transmission with a neighbor report frame 500 previously discussed. Receiving the neighbor report may include receiving the beacon transmission, parsing the received frames, and storing the respective fields in the frames. At stage 710, the client station 120 is configured to determine the location of one or more access points in the neighbor report. In an example, a neighbor report includes one or more neighbor record elements 510, and each record element includes location information associated with an access point. The record elements may also include RTT and RSSI information for the neighbors. The neighbor record elements may be indexed based on the importance of the neighbor in a position calculation. For example, the neighbors may be indexed based on geometric orientation (i.e., triangulation) in an effort to improve the position calculation.

At stage 712, the client station 120, or the position server 152, may be configured to determine the current position of the client station based at least in part on the location of the one or more access points. As previously described, in a passive positioning scheme, the client station 120 is configured to receive and capture information related to the FTM messages flowing between the access points (e.g., 108, 110, 112). The client station 120 includes a positioning unit configured to utilize the information included in the neighbor report in conjunction with FTM message information (e.g., RTT, RSSI, TOA, and TDOA data) to determine the current position of the client station. The current position of the client station may be stored locally, or on the position server 152, or on other network resources, and may be used with location based services. Optionally, the client station 120 may be configured to display current position of the client station at stage 714.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to execute (e.g., perform) a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a non-transitory processor-readable storage medium, a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 8A:
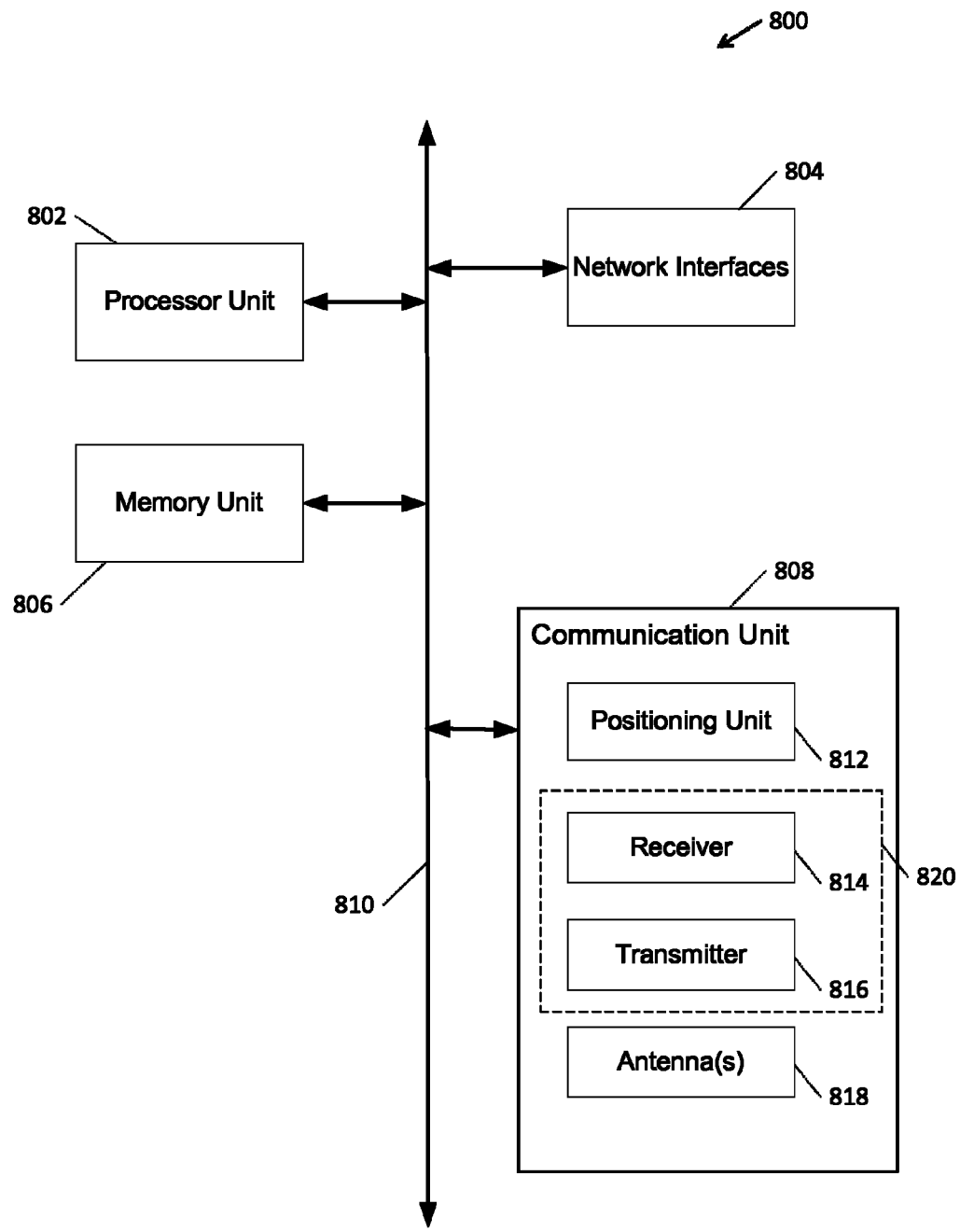
FIG. 8A a block diagram of an electronic device for use in passive positioning utilizing beacon neighbor reports.

Referring to FIG. 8A is a block diagram of one embodiment of an electronic device 800 for use in passive positioning utilizing beacon neighbor reports. In some implementations, the electronic device 800 may be a client station 120 embodied in a device such as a notebook computer, a tablet computer, a netbook, a mobile phone, a smart phone, a gaming console, a personal digital assistant (PDA), or an inventory tag. The electronic device 800 may be other electronic systems such as a Home Node B (HNB) device with a wireless transceiver and positioning capabilities (e.g., a type of access point). The electronic device 800 includes a processor unit 802 (possibly including multiple processors, multiple cores, multiple nodes, and/or implementing multi-threading, etc.). The electronic device 800 includes a memory unit 806. The memory unit 806 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 800 also includes a bus 810 (e.g., PCI, ISA, PCI-Express, HyperTransport®, InfiniBand®, NuBus, AHB, AXI, etc.), and network interfaces 804 that include at least one of a wireless network interface (e.g., a WLAN interface, a Bluetooth® interface, a WiMAX interface, a ZigBee® interface, a Wireless USB interface, etc.) and a wired network interface (e.g., an Ethernet interface, etc.).

The electronic device 800 also includes a communication unit 808. The communication unit 808 comprises a positioning unit 812, a receiver 814, a transmitter 816, and one or more antennas 818. The transmitter 816, the antennas 818, and the receiver 814 form a wireless communication module (with the transmitter 816 and the receiver 814 being a transceiver 820). The transmitter 816 and the receiver 814 are configured to communicate bi-directionally with one or more client stations and other access points via a corresponding antennas 818. In some embodiments, the electronic device 800 can be configured as a WLAN station with positioning determining capabilities (e.g., a type of access point). The positioning unit 812 can detect the FTM request/response messages exchanged between the access points to determine TDOA timing information associated with the access points. The positioning unit 812 can determine the position of the electronic device 800 based, at least in part, on the TDOA timing information, and the AP position information, as described above with reference to FIGS. 1A-7. In some embodiments, the access points 102, 104, 106 can also be configured as the electronic device 800 of FIG. 8A. In this embodiment, the access points can use their processing capabilities to execute their respective operations described above. Any one of these functionalities may be partially (or entirely) implemented in hardware and/or on the processor unit 802. For example, the functionality may be implemented with an application specific integrated circuit, in logic implemented in the processor unit 802, in a co-processor on a peripheral device or card, etc. Further, realizations may include fewer or additional components not illustrated in FIG. 8A (e.g., video cards, audio cards, additional network interfaces, peripheral devices, etc.). The processor unit 802, the memory unit 806, and the network interfaces 804 are coupled to the bus 810. Although illustrated as being coupled to the bus 810, the memory unit 806 may be coupled to the processor unit 802.

Figure 8B:
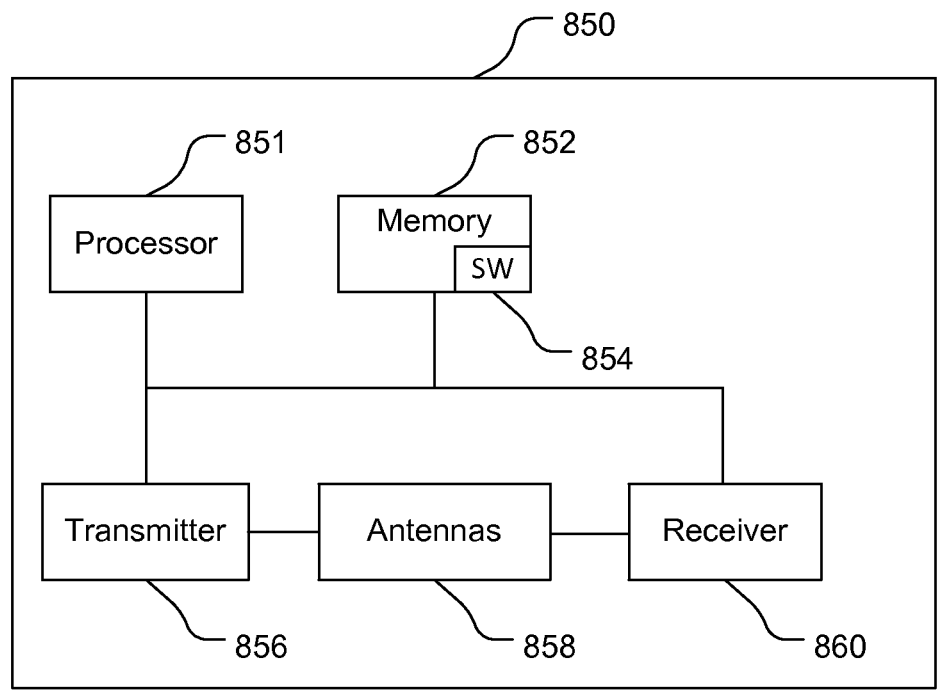
FIG. 8B is a block diagram of an exemplary access point.

Referring to FIG. 8B, an example of an Access Point (AP) 850 comprises a computer system including a processor 851, memory 852 including software 854, a transmitter 856, antennas 858, and a receiver 860. In some embodiments, the access points 102, 104, 106 can also be configured as the AP 850 of FIG. 8B. The transmitter 856, antennas 858, and the receiver 860 form a wireless communication module (with the transmitter 856 and the receiver 860 being a transceiver). The transmitter 856 is connected to one of the antennas 858 and the receiver 860 is connected to another of the antennas 858. Other example APs may have different configurations, e.g., with only one antenna 858, and/or with multiple transmitters 856 and/or multiple receivers 860. The transmitter 856 and the receiver 860 are configured such that the AP 850 can communicate bi-directionally with the client station 120 via the antennas 858. The processor 851 is preferably an intelligent hardware device, e.g., a central processing unit (CPU) such as those made by ARM®, Intel® Corporation, or AMD®, a microcontroller, an application specific integrated circuit (ASIC), etc. The processor 851 could comprise multiple separate physical entities that can be distributed in the AP 850. The memory 852 includes random access memory (RAM) and read-only memory (ROM). The memory 852 is a processor-readable storage medium that stores the software 854 which is processor-readable, processor-executable software code containing processor-readable instructions that are configured to, when executed, cause the processor 851 to perform various functions described herein (although the description may refer only to the processor 851 performing the functions). Alternatively, the software 854 may not be directly executable by the processor 851 but configured to cause the processor 851, e.g., when compiled and executed, to perform the functions.

While the embodiments are described with reference to various implementations and exploitations, it will be understood that these embodiments are illustrative and that the scope of the inventive subject matter is not limited to them. In general, techniques for a passive positioning utilizing beacon neighbor reports for wireless communication devices as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

As used herein, including in the claims, unless otherwise stated, a statement that a function or operation is "based on" an item or condition means that the function or operation is based on the stated item or condition and may be based on one or more items and/or conditions in addition to the stated item or condition.

Further, more than one invention may be disclosed.

The invention claimed is:

1. A wireless transceiver for providing network information to a broadcast area, comprising:
   a memory;
   at least one processor coupled to the memory and configured to:
   periodically broadcast a beacon transmission with a neighbor report count value at a first interval of time, wherein the neighbor report count value indicates a number of subsequent beacon transmissions to be broadcast before a neighbor report element is provided; and
   periodically broadcast the beacon transmission with the neighbor report element and an Access Point to Access Point (AP-to-AP) signaling parameter format information element at a second interval of time, wherein the neighbor report element includes one or more neighbor record elements comprising a Basic Service Set Identification (BSSID) associated with an access point, and a visitation index to indicate an order in which the wireless transceiver will send Fine Timing Measurement (FTM) packets to the respective access point, and the AP-to-AP signaling parameter format information element includes a AP-to-AP switch period to indicate a duration when the wireless transceiver will switch to a next access point in the visitation index, wherein the AP-to-AP switch period is greater than the first interval of time.

2. The wireless transceiver of claim 1 wherein the neighbor report count value is an integer value.

3. The wireless transceiver of claim 1 wherein the beacon transmission with the neighbor report count value and the beacon transmission with the neighbor report element comprise a Media Access Control (MAC) control frame format.

4. The wireless transceiver of claim 1 wherein the beacon transmission with the neighbor report element includes a latitude value and a longitude value.

5. A method for broadcasting network neighbor reports with an access point, comprising:
generating a beacon transmission;
determining a neighbor report count value, wherein the neighbor report count value indicates a number of subsequent beacon transmissions to be broadcast before a neighbor report is provided;
if the neighbor report count value is greater than zero, then broadcasting the beacon transmission including at least a beacon frame and the neighbor report count value;
decrementing the neighbor report count value;
if the neighbor report count value is equal to zero, then broadcasting the beacon transmission including at least the beacon frame an Access Point to Access Point (AP-to-AP) signaling parameter format information element and the neighbor report, wherein neighbor report includes one or more neighbor report elements comprising a Basic Service Set Identification (BS SID) associated with an access point, and a visitation index to indicate an order in which Fine Timing Measurement (FTM) packets will be sent to the respective access point and the AP-to-AP signaling parameter format information element includes a AP-to-AP switch period to indicate a duration when the wireless transceiver will switch to a next access point in the visitation index, wherein the AP-to-AP switch period is greater than a first interval of time; and
resetting the neighbor report count value.

6. The method of claim 5 wherein the one or more neighbor report elements includes a latitude value, longitude value, and Z axis information.

7. The method of claim 5 wherein the AP-to-AP signaling parameter element includes an AP-to-AP Fine Timing Measurement (FTM) burst timeout value.

8. The method of claim 5 wherein the AP-to-AP signaling parameter element includes a Minimum Delta Fine Timing Measurement (FTM) value.

9. The method of claim 5 wherein resetting the neighbor report count value includes setting the neighbor report count value to a value between 200 and 1000.

10. The method of claim 5 wherein the beacon transmission is generated and broadcast at least every 100 milliseconds.

11. A method for determining a current position with a client station, comprising:
receiving a network beacon transmission with the client station;
determining a neighbor report count value based on the network beacon transmission, wherein the neighbor report count value indicates a number of subsequent beacon transmissions to be broadcast before neighbor information is provided;
receiving a neighbor report and an Access Point to Access Point (AP-to-AP) signaling parameter format information if the neighbor report count value equals zero, wherein the neighbor report includes one or more neighbor record elements comprising a Basic Service Set Identification (BSSID) associated with an access point, and a visitation index to indicate an order in which at least one Fine Timing Measurement (FTM) message will be transmitted to the respective access point, and the AP-to-AP signaling parameter format information element includes a AP-to-AP switch period to indicate a duration when the wireless transceiver will switch to a next access point in the visitation index, wherein the AP-to-AP switch period is greater than a first interval of time;
determining a location of an access point in the neighbor report; and
calculating the current position of the client station based at least in part on the location of the access point in the neighbor report.

12. The method of claim 11 further comprising receiving at least one Fine Timing Measurement (FTM) message transmitted between two or more access points included in the one or more neighbor record elements.

13. A non-transitory processor-readable storage medium comprising processor-readable instructions for providing network information to a broadcast area with a wireless transceiver, the instructions comprising:
code for periodically broadcasting a beacon transmission with a neighbor report count value at a first interval of time, wherein the neighbor report count value indicates a number of subsequent beacon transmissions to be broadcast before a neighbor report element is provided; and
code for periodically broadcasting the beacon transmission with the neighbor report element and an Access Point to Access Point (AP-to-AP) signaling parameter format information element at a second interval of time, wherein the neighbor report element includes one or more neighbor record elements comprising a Basic Service Set Identification (BS SID) associated with an access point, and a visitation index to indicate an order in which the wireless transceiver will send Fine Timing Measurement (FTM) packets to the respective access point, and the AP-to-AP signaling parameter format information element includes a AP-to-AP switch period to indicate a duration when the wireless transceiver will switch to a next access point in the visitation index, wherein the AP-to-AP switch period is greater than the first interval of time.

14. The non-transitory processor-readable storage medium of claim 13 wherein the beacon transmission with the neighbor report count value and the beacon transmission with the neighbor report element comprise a Media Access Control (MAC) control frame format.

15. The non-transitory processor-readable storage medium of claim 13 wherein the beacon transmission with the neighbor report element includes a latitude value and a longitude value.

* * * * *